US009654349B2

(12) United States Patent
Kautto-Koivula et al.

(10) Patent No.: US 9,654,349 B2
(45) Date of Patent: *May 16, 2017

(54) SYSTEM AND METHOD FOR FUNCTIONAL ELEMENTS

(71) Applicant: Nokia Technologies Oy, Espoo (FI)

(72) Inventors: Kaisa Kautto-Koivula, Espoo (FI); Marita Huhtaniemi, Helsinki (FI); Petri Lahdesmaki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/934,311

(22) Filed: Nov. 6, 2015

(65) Prior Publication Data
US 2016/0065415 A1 Mar. 3, 2016

Related U.S. Application Data

(63) Continuation of application No. 13/111,171, filed on May 19, 2011, now Pat. No. 9,182,877, and a continuation of application No. 11/748,158, filed on May 14, 2007, now Pat. No. 9,075,495, and a continuation of application No. 10/739,600, filed on
(Continued)

(51) Int. Cl.
| G06F 15/00 | (2006.01) |
| G06F 13/00 | (2006.01) |
| H04L 12/24 | (2006.01) |
| G06F 3/0481 | (2013.01) |
| G06F 9/44 | (2006.01) |
| H04M 1/725 | (2006.01) |
| G06F 3/0484 | (2013.01) |
| G06F 9/445 | (2006.01) |

(52) U.S. Cl.
CPC .......... *H04L 41/22* (2013.01); *G06F 3/0481* (2013.01); *G06F 3/04842* (2013.01); *G06F 9/4443* (2013.01); *H04M 1/72563* (2013.01); *G06F 9/44505* (2013.01)

(58) Field of Classification Search
CPC ............................. G06F 8/76; G06F 17/30873
USPC ................ 715/761–765, 851–853, 741–743
See application file for complete search history.

(56) References Cited

U.S. PATENT DOCUMENTS

| 5,148,154 A | 9/1992 | MacKay et al. |
| 5,202,828 A | 4/1993 | Vertelney et al. |

(Continued)

FOREIGN PATENT DOCUMENTS

| CN | 1894656 A | 1/2007 |
| EP | 1695173 A2 | 8/2006 |

(Continued)

OTHER PUBLICATIONS

Mind Mapping FAQ (http://web.archive.org/web/20001202121800/http://world.std.com/~emagic/mindmap.html), downloaded Aug. 22, 2005.

(Continued)

*Primary Examiner* — Kevin Nguyen
(74) *Attorney, Agent, or Firm* — Alston & Bird LLP

(57) ABSTRACT

Systems and methods whereby, for example, one or more functional elements can be established and/or employed. Such functional elements might serve a number of purposes. For instance, such functional elements might be employable in interoperating with devices, software, and/or the like, in working with entities, and/or the like. Such functional elements may, for example, be arrangeable in an associative and/or hierarchical manner.

20 Claims, 7 Drawing Sheets

Related U.S. Application Data

Dec. 17, 2003, now Pat. No. 7,246,325, and a continuation-in-part of application No. 10/028,170, filed on Dec. 20, 2001, now Pat. No. 7,058,895, and a continuation-in-part of application No. 10/028,032, filed on Dec. 20, 2001, now Pat. No. 7,313,766.

(56) References Cited

U.S. PATENT DOCUMENTS

| | | |
|---|---|---|
| 5,594,858 A | 1/1997 | Blevins |
| 5,966,532 A | 10/1999 | McDonald et al. |
| 6,031,537 A | 2/2000 | Hugh |
| 6,037,944 A | 3/2000 | Hugh |
| 6,075,843 A | 6/2000 | Cave |
| 6,144,962 A | 11/2000 | Weinberg et al. |
| 6,166,739 A | 12/2000 | Hugh |
| 6,323,881 B1 | 11/2001 | Broulik et al. |
| 6,434,595 B1 | 8/2002 | Suzuki et al. |
| 6,462,676 B1 | 10/2002 | Koizumi |
| 6,499,026 B1 | 12/2002 | Rivette et al. |
| 6,574,553 B1 | 6/2003 | Beesley et al. |
| 6,633,315 B1 | 10/2003 | Sobeski et al. |
| 6,678,611 B2 | 1/2004 | Khavakh et al. |
| 6,683,633 B2 | 1/2004 | Holtzblatt et al. |
| 6,708,172 B1 | 3/2004 | Wong et al. |
| 6,732,331 B1 | 5/2004 | Alexander |
| 6,735,518 B2 | 5/2004 | Kim |
| 7,246,325 B2 | 7/2007 | Kautto-Koivula et al. |
| 7,366,991 B1 | 4/2008 | Snapkauskas et al. |
| 9,075,495 B2 | 7/2015 | Kautto-Koivula et al. |
| 9,182,877 B2 | 11/2015 | Kautto-Koivula et al. |
| 2001/0045963 A1 | 11/2001 | Marcos et al. |
| 2002/0105546 A1 | 8/2002 | Kuntz |
| 2002/0105548 A1 | 8/2002 | Hayton et al. |
| 2002/0152244 A1 | 10/2002 | Dean et al. |
| 2002/0184401 A1 | 12/2002 | Kadel et al. |
| 2003/0120593 A1 | 6/2003 | Bansal et al. |
| 2004/0070612 A1 | 4/2004 | Sinclair et al. |
| 2004/0098522 A1 | 5/2004 | Holtzblatt et al. |
| 2004/0113941 A1 | 6/2004 | Sliwa et al. |
| 2005/0010901 A1 | 1/2005 | Udler et al. |
| 2005/0055639 A1 | 3/2005 | Fogg |

FOREIGN PATENT DOCUMENTS

| | | |
|---|---|---|
| GB | 2369280 A | 5/2002 |
| WO | WO-2004/027700 A1 | 4/2004 |
| WO | WO-2005/059674 A2 | 6/2005 |

OTHER PUBLICATIONS

Mindmapper.com (http://www.mindmapper.com), downloaded Jun. 28, 2005.
Mindjet: Software for Visualizing and Managing Information (http://www.mindjet.com/us/), downloaded Jun. 28, 2005.
Alles über Mind Mapping (http://www.zmija.de/mindmap.htm), downloaded Jun. 28, 2005.
Superlearning: Mind Mapping: Mind Mapping Brain Links—Mind Mapping Works! (http://web.archive.org/web/20010606154437/http://www.tiac.net/users/seeker/brainlinks.html), downloaded Aug. 22, 2005.
Mind Tools—Career Training, Management Training, Leadership Skill and Career Coaching (http://www.mindtools.com/index.html), downloaded Jun. 28, 2005.
Mind Mapping am Computer (http://lernen-heute.de/mind_mapping_am_comter.html), downloaded Jun. 28, 2005.
Memes.net—Mind Mapping (http://web.archive.org/web/20010629204944/http://www.memes.net/index/php?request=displaypage&NodeID=418), downloaded Aug. 22, 2005.
Banxia Decision Explorer Mind Mapping Comparison (http://www.banxia.com/demindmap.html), downloaded Jun. 28, 2005.
Graphics Software > Charts in the Yahoo! Directory (http://dir.yahoo.com/Business_and_Economy/Business_toBusiness/Computers/Software/Graphics/Charts/), downloaded Jun. 28, 2005.
Mayjjer Consulting: Mind Mapping vs. Knowledge Mapping (http://web.archive.org/web/20010723224611/http://www.mayjjer.com/mind-mapping.html), downloaded Aug. 22, 2005.
KMTool-Google Web Directory—Reference > Knowledge Management > Knowledge Creation> . . . (http://directory.google.com/Top/Reference/Knowledge_Management/Knowledge_Creation/Mind_Mapping/), downloaded Aug. 20, 2005.
Concept Mapping Homepage (http://users.edte.utwente.nl/lanzing/cm_home.htm), downloaded Aug. 20, 2005.
Mind Maps (http://tech.wwps.org/garrison/klehmann/mmc/mindmap.htm), downloaded Aug. 20, 2005.
KmMapTools (http://www.voght.com/cgi-bin/pywiki?KmMapTools), downloaded Aug. 22, 2005.
Laboratory for Interactive Learning Technologies: Project Ideas (http://web.archive.org/web/20010417223835/lilt.ics.hawaii.edu/lilt/opportunities/students/project-ideas.htm), downloaded Aug. 22, 2005.
Open Directory—Computers: Software: Internet: Servers: Personalization (http://dmoz.org/Computers/Software/Internet/Servers/Personalization/), downloaded Aug. 20, 2005.
Collaboration—People Sharing Ideas Learn From Each Other (http://kmtool.netl), downloaded Aug. 20, 2005.
Knowledge Management Tools (HSERV 590A, Module 39) (http://courses.washington.edu/~hs590a/modules/39/kmtools39.html), downloaded Aug. 20, 2005.
Creativity Tools (http://web.archive.org/20010702115454/http://www.businesscreativitynetwork.org.uk/tools.htm), downloaded Aug. 22, 2005.
Graphics Organizer Index (http://www.graphic.org/goindex.html), downloaded Aug. 20, 2005.
Concept Mapping/ Semantic Networking/Knowledge Representation Websites (http://www.sci.sdsu.edu/crmse/kfisher_knowrep.html), downloaded Aug. 20, 2005.
Mind Mapping Software—Mindmap Programme—Kreativitätssoftware / mindmap.ch (http://www.mindmap.ch.software.htm), downloaded Aug. 20, 2005.
S. Tilly; Domain-Retargetable Reverse Engineering II: Personalized User Interfaces; Dept of Computer Science, University of Victoria, Victoria, BC, Canada.
Supplementary European Search Report, dated Mar. 2, 2011.
"OWL-S: Semantic Markup for Web Services—The OWL Services Coalition", pp. 1-25.
Ankolekar, A. et al., "DAML-S: Web Service Description for the Semantice Web", 15 pp.
Ankolekar, A. et al., "DAML-S: Semantic Markup for Web Services", 20 pp.
Sivashmugam, K. et al., "Framework for Semantic Web Process Composition" Technical Report 03-008, LSDIS Lab Dept. of Computer Science, UGA, Jun. 2003, pp. 1-42.
Lassila O. et al., "The Role of Frame-Based Representation on the Semantic Web", Software Technology Laboratory, Nokia Research Center, Knowledge Systems Laboratory, Standford University, 9 pp.
Search Report for International Application PCT/IB04/04167.
"Motorola Makes Equity Investment in Thinkmap." [retrieved Nov. 22, 2016]. Retrieved via the Internet Archive Wayback Machine at URL: <https://web.archive.org/web/20010409104249/http://www.thinkmap.com/sub_article.cfm?subarticleID=92&SectionID=6&articleID=43>, (dated Nov. 7, 2000), 2 pages.
"Pétillant ®: Choisir un logiciel de Mind Mapping" [retrieved Nov. 18, 2016]. Retrieved via the Internet Archive Wayback Machine at URL: <https://web.archive.org/web/20040514134427/http://www.petillant.com/mindmapping/logicels.htm>, dated Mar. 13, 2004, 3 pages.
"Pétillant ®: Découvrez le site expert de la carte heuristique (Mind Mapping)"[retrieved Nov. 18, 2016]. Retrieved via the Internet Archive Wayback Machine at URL: <https://web.archive.org/web/20050613001203/http://www.petillant.com/>, dated May 27, 2005, 2 pages.
"Software for Creativity & Idea Generation." [retrieved Nov. 18, 2016]. Retrieved via the Internet Archive Wayback Machine at

(56) References Cited

OTHER PUBLICATIONS

URL: <http://web.archive.org/web/20010620000838/http://members.ozemail.com.au/~caveman/Creative/Software/swindex.htm#m85>, dated Jun. 14, 2000, 14 pages.
"Thread Index—Jul. 1999" [retrieved Nov. 18, 2016]. Retrieved via the Internet Archive Wayback Machine at URL: <http://web.archive.org/web/20010604192734/http://lists.omnipotent.net/pilot/199907/>, dated Jul. 1999, 5 pages.
Written Opinion of the International Searching Authority for International Patent Application No. PCT/IB04/04167, dated Nov. 8, 2005, 3 pages.

SYSTEM AND METHOD FOR FUNCTIONAL ELEMENTS

This application is a continuation of co-pending U.S. Ser. No. 13/111,171 filed on May 19, 2011, entitled "System and Method for Functional Elements", which is a continuation of U.S. Ser. No. 11/748,158 filed on May 14, 2007, now U.S. Pat. No. 9,075,495, entitled "System and Method for Functional Elements", which is a continuation of U.S. Ser. No. 10/739,600, filed Dec. 17, 2003, now U.S. Pat. No. 7,246,325, entitled "System and Method for Functional Elements", which is a Continuation-in-Part of U.S. Ser. No. 10/028,170, filed Dec. 20, 2001, now U.S. Pat. No. 7,058,895, entitled "Method, System and Apparatus for Constructing Fully Personalized and Contextualized Interaction Environment for Terminals in Mobile Use", and U.S. Ser. No. 10/028,032, filed Dec. 20, 2001, now U.S. Pat. No. 7,313,766, entitled, "Method, System and Apparatus for Constructing Fully Personalized and Contextualized User Interfaces for Terminals in Mobile Use", which are incorporated herein by reference.

FIELD OF INVENTION

This invention relates to systems and methods for functional elements.

BACKGROUND INFORMATION

In recent years, computers have gained an increasingly prominent role in the lives of many people. For example, many people have come to rely upon computers to handle their media (e.g., movies, images, and/or music), their communications (e.g., text, voice, and/or video communications), their entertainment (e.g., video games), and/or the like.

Accordingly, there may be interest in technologies that further allow people to incorporate computers into their lives.

SUMMARY OF THE INVENTION

According to various embodiments of the present invention, there are provided systems and methods whereby, for example, one or more functional elements can be established and/or employed. Such functional elements might serve a number of purposes. For instance, such functional elements might be employable in interoperating with devices, software, and/or the like, in working with entities, and/or the like.

Such functional elements may, for example, be arrangeable in an associative and/or hierarchical manner.

DETAILED DESCRIPTION OF THE INVENTION

General Operation

According to various embodiments of the present invention, there are provided systems and methods whereby, for example, one or more functional elements can be established and/or employed. Moreover, in various embodiments such functional elements may be arranged in an associative and/or hierarchical manner.

Embodiments of the present invention allow for views corresponding to such functional elements and/or such arrangements. Such functional elements might, in various embodiments, serve a number of purposes. For example, such functional elements might be employable in interoperating with devices, software, and/or the like, in working with entities, and/or the like. Interface software modules might, in various embodiments, be employed in such interoperation.

In various embodiments, functional elements can be created using functional element templates. Such element templates might, for example, be provided to users. As another example, users might alternately or additionally, be able to create their own element templates.

Various aspects of the present invention will now be discussed in greater detail.

Functional Element Establishment

Figure 1:
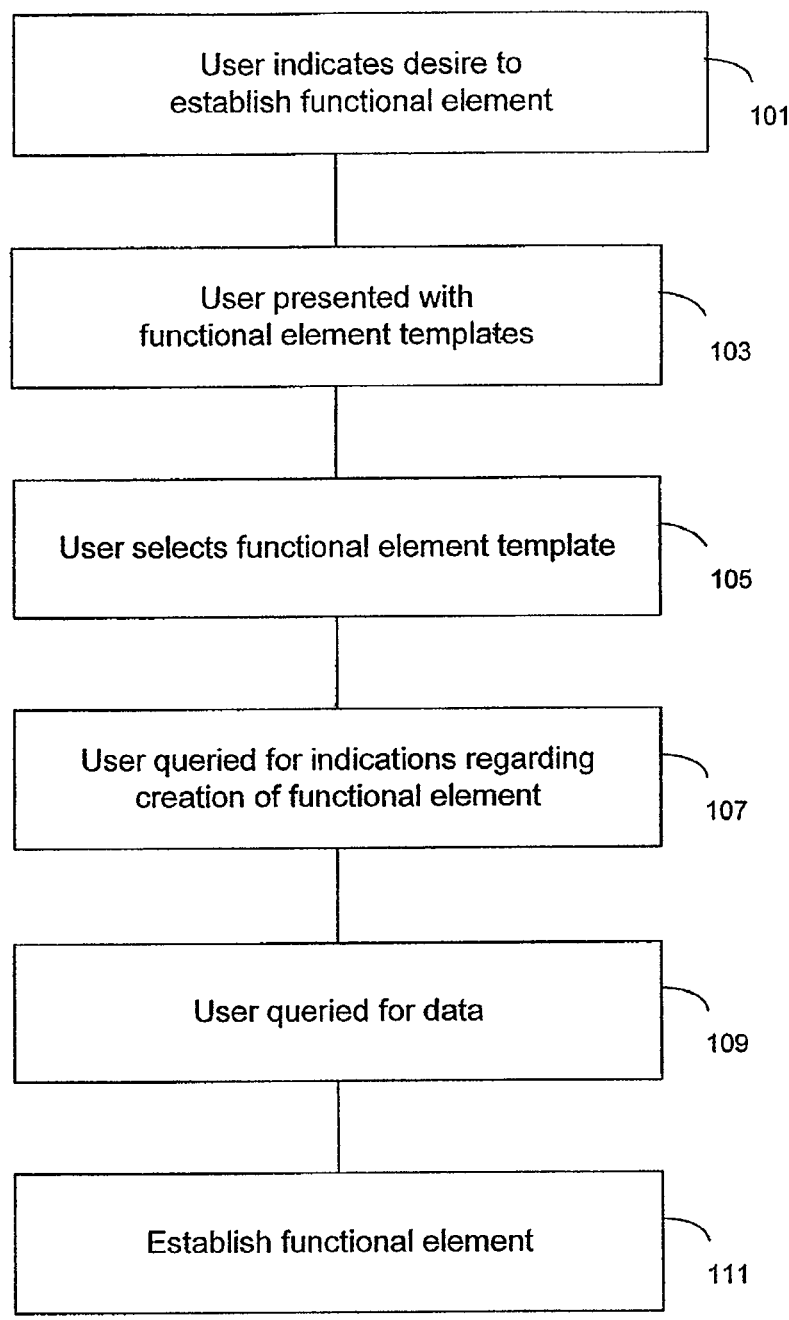
FIG. 1 is a diagram depicting exemplary steps involved in functional element establishment according to various embodiments of the present invention.

In various embodiments action may be taken to establish a functional element (FE). Such action might, for example, be taken by a user. With regard to FIG. 1 it is noted that, according to various embodiments of the present invention, a user whishing to establish an FE might, for example, indicate a desire to do so via graphical user interface (GUI) or other interface provided by her node (step 101).

In response, the user's node could, for example, act to present the user with one or more existing functional element templates (FETs) from which the FE could be created (step 103). As another example, the user's node could, alternately or additionally, offer the user the opportunity to establish a new FET, fetch a new FET, and/or the like.

A wide variety of FETs can exist. For example, there may be FETs relating to one or more of entities (e.g., media, text, contacts, schedule, and/or the like), devices (e.g., computers, peripherals, consumer electronics, appliances, architectural fixtures, vehicles, and/or the like), and/or the like.

As is discussed in greater detail below, possessed by a FET may, for example, be one or more attributes capable of being passed on to an FE created using the template. It is noted that, in various embodiments, an FE created using a FET need not be imbued with all of the attributes available from the template.

Attributes might, for instance, fall under one or more categories. For example, one such category could be a data category. Such a category might, for instance, be employed where an FE created from a FET was to hold data and/or links to data. As is discussed in greater detail below, among attributes falling under the data category could, for instance, be one or more data fields. Included in various embodiments could be a field to hold a name for an established FE.

As another example of a category, there could be an input-output category. Such a category could be employed, for example, where an FE created from a FET was to be employed in interoperating with devices, software, and/or the like. Among attributes falling under the input-output category could, for instance, be information regarding one or more commands and/or command pathways.

As yet another example, of a category, there could be an property-action category. Such a category could be employed, for example, where an FE created from a FET was to perform certain actions, possess certain dynamic and/or static properties, and/or the like. Among attributes falling under the property-action category could, for instance, be information regarding specific actions to be performed, properties regarding interaction with a user and/or display to a user, and/or the like. For instance, details regarding scripts to be followed, graphic control panels or the like to be presented to a user, properties and/or functionalities for a graphical element to depict the FE, and/or the like might be included. It is noted that, in various embodiments, scripts to be followed could employ commands and/or command pathways input-output-category attributes.

In the case where the user selected an existing FET (step 105), the user might, in various embodiments, be able to provide one or more indications regarding creation of the FE (step 107). For instance, where the selected FET possessed a number of attributes, the user might be able to select which of those attributes would be passed on to the created functional element. For example, the user might select which input-output category and/or property-action category attributes would be passed on.

Moreover, in various embodiments the user might, for instance, where a FET was capable of interoperating with multiple devices and/or pieces of software, be able to specify with which devices and/or pieces of software interoperation should occur. For example, where an FET was able to produce FEs with washing machine and sauna control capabilities, a user might be able to specify that only washing machine control capabilities were desired.

Further, the user might, in various embodiments, be queried for various data to be used in establishment of the FE (step 109). For example, where a created FE was to hold data, the user could be queried to provide and/or to provide a link to such data.

As a specific example, where a created FE would correspond to a contact, the user might be queried to enter various data regarding the contact (e.g., name, telephone number, and/or the like) and/or to provide a link to such data.

As another example, where a created functional element would interoperate with a remote device (e.g., with a sauna for control purposes), the user might be queried for a network address or the like via which the device could be contacted. As still another example, where the FE being created was receiving one or more property-action attributes from the chosen FET, the user might be queried to provide corresponding data. As a specific example, where a property-action attribute received from the chosen FET dealt with an action to be performed at a specific time each day, the user might be required to specify that time.

It is noted that, in various embodiments, certain data to be held and/or used by an FE might not be provided at time of establishment of the FE, but instead be provided during use of the FE. It is further noted that, in various embodiments, in establishing an FE a user might act to specify one or more interface software modules should be employed by the established FE.

It is further noted that, in various embodiments, data might be received from other than a user. For instance, data might be received from, created by, provided by, sold by, and/or the like by one or more system administrators, one or more device manufacturers, one or more software manufacturers, one or more of various third parties, one or more FETs, one or more basic element types (described below), and/or the like.

With any required data having been received, one or more steps could be taken to establish the new FE (step 111). For example, one or more corresponding entries could be placed in a database or other store. Such entries could, for example, include attributes received from the employed FET and/or data provided, for example, by the user. As noted above, in various embodiments, rather than using an existing functional element template, a user could indicate a desire to fetch a new functional element template.

Such functionality could be implemented in a number of ways. For example, a connection to a server or the like could be made, and/or peer-to-peer communications could be established with another node, and the user could browse through available functional element templates and select one or more for receipt. Such browsing and/or selection could, for example, be performed via a GUI or the like provided by her node. The node could then act to receive the selected functional element templates and make them available to the user. Communications between the node and the server and/or other node could be performed in a number of ways. For example, simple object access protocol (SOAP), remote method invocation (RMI), Java messaging service (JMS), and/or the like might be employed.

Functional Element Template Establishment

As noted above, in various embodiments, rather than using an existing FET, a user could act to establish a new FET. Moreover, in various embodiments, FETS could be established by other than a node's user. Various aspects of FET establishment will now be discussed.

Figure 2:
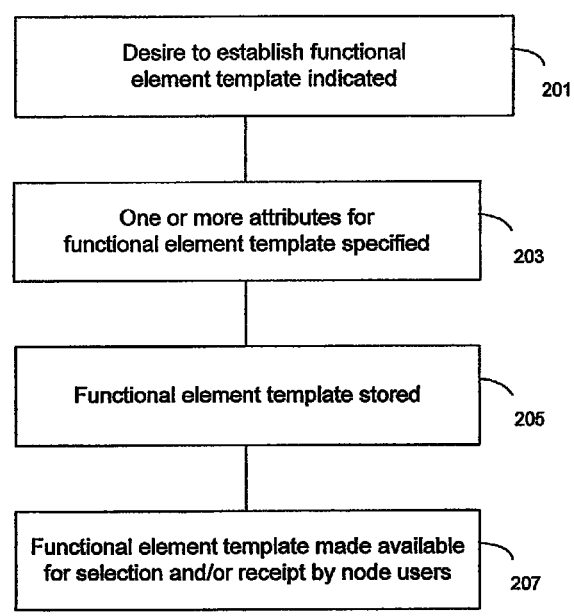
FIG. 2 is a diagram depicting exemplary steps involved in functional element template establishment according to various embodiments of the present invention.

With regard to FIG. 2 it is noted that, an individual wishing to establish an FET might first indicate a desire to do so via, for instance, a GUI or the like provided by a node or the like (step 201). According to various embodiments of the present invention, one step in establishment of a FET may be to specify one or more attributes of the sort discussed above (step 203).

As alluded to above, includable attributes could include, for example, data-type, input-output-type, and/or property-action-type attributes. Choice of attributes to include in an FET could, for example, take into account the intended use of FEs created with it. To illustrate by way of example, the creation of several exemplary FETs will now be discussed.

As one example, a software/device control FET might be created. Such an FET might be employed, for instance, in creating FEs related to a device such as, for example, a washing machine, a dishwasher, a home entertainment unit (e.g., a personal video recorder (PVR)), a hot tub, a sauna, an oven, a microwave oven, a dishwasher, a computer, a phone, a computer peripheral, a digital image capture device, a digital audio capture device, a vehicle, and/or the like and/or in creating FEs related to software such as, for example, a word processor, a spreadsheet, a presentation program, an organizer, a database, a web browser, a media use and/or editing program, and/or the like.

Included among data-type attributes for such an FET could, for instance, be a network address via which a device and/or software could be reached, one or more attributes to hold a log of device and/or software events, and/or the like.

Included among input-output-type attributes for such an FET could, for instance, be one or more commands applicable in communicating, perhaps via one or more interface software modules, with one or more devices and/or software, and/or with one or more types of devices and/or software. Among such commands could be, for example, turn-on commands, turn-off commands, set status commands (e.g., set temperature, set mode, set time, submit data, dial number, dispatch MMS (Multimedia Messaging Service) message, dispatch email, dispatch fax, dispatch SMS (Short Message Service) message, and/or the like), read status commands (e.g., monitor temperature, monitor mode, monitor time elapsed, receive data, and/or the like), software-access commands, and/or the like.

It is noted that, in various embodiments, such commands could be of a generic type such that they could, for example, be understood by interface software modules corresponding to different sorts of devices and/or software (e.g., washing machines, home entertainment units, hot tubs, microwave ovens, word processors, and/or spreadsheets), and/or by interface modules corresponding to different brands, makes, models, and/or the like of a particular sort of device and/or software (e.g., different brands of microwave ovens or different word processing programs).

Included among property-action-type attributes could, for example, be attributes regarding how information corresponding to operation of an FE created using the FET be displayed to a user, perhaps via a GUI or the like. For example, one or more attributes could be included that specified a GUI control panel or the like for interacting with a device and/or software with which communications were established.

As still another example, a device-on FET might be created. Such an FET could be employed, for instance, in creating FEs which acted to allow a user to turn on a device of the sort just described.

Included among data-type attributes and input-output-type attributes for such an FET could, for instance, be one or more attributes of the sort discussed above with respect to the exemplary software/device control FET. As a specific example, with respect to input-output-type attributes, only a turn-on command input-output-type attribute might be included.

Included among property-action-type attributes for such an FET could be, for example, be attributes regarding how user actions, perhaps provided by a GUI or the like, could affect operation of an FE created using the FET. For example, one or more attributes could be included that indicated that a user should be presented with an GUI widget which, when activated, would cause a device to be turned on (e.g., would cause the created FE to make use of a turn-on command input-output-type attribute). As another example, one or more such attributes could specify that a first device power up upon receipt of information from another device. For instance, such attributes could specify that a lighting system device and a home entertainment system device be powered-on upon a sensor device determining that someone has entered a room, and/or upon a Bluetooth, 802.11b, and/or 802.11g base station determining that one of a specified set of user nodes has entered vicinity.

It is noted that, according to various embodiments, portions of an existing FET could be employed in the creation of a new FET. Accordingly, in various embodiments, such a device-on FET might, be created in a manner employing portions of an existing software/device control FET of the sort described above.

As yet another example, an entity FET might be created. Such an FET could, for example, be employed in creating FEs that held and/or linked to entities (e.g., media, text, contacts, schedule, and/or the like).

Included among data-type attributes for such an FET could, for example, be one or more fields to hold entity-related data. For example, one or more specific fields such as "name", "address", "phone number", "time", "date", "subject", and/or the like might be included. As another example, one or more general fields might alternately or additionally be included. Such a general field could, for example, hold all or some of an entity, perhaps via Base64 encoding, uuencode encoding, and/or the like. As yet another example, metadata data-type attributes might be included. In various embodiments, no input-output-type attributes or property-action-type attributes might be included.

As a further example, an entity use FET might be created. Such an FET might, for example, be employed in creating FEs which held and/or linked to entities (e.g., media, text, contacts, schedule, and/or the like) and which interoperated with devices, software, and/or the like. Such an FET might, for example, be employed in creating an FET that could control a device in accordance with schedule information provided by a schedule entity (e.g., turn-on and turn-off of a device in accordance with the schedule entity).

Included among data-type attributes for such an FET could, for instance, be one or more attributes of the sort discussed above with respect to the exemplary entity FET.

Included among input-output-type attributes for such an FET could, for instance, be one or more attributes of the sort discussed above with respect to the exemplary software/device control FET.

In various embodiments, no property-action-type attributes might be included. Alternately, property-action-type attributes might be included which indicated that software and/or a device be controlled in accordance with an associated entity. Such an entity use FET might in various embodiments, perhaps in a manner analogous to that discussed above, be created in a manner employing portions of an existing entity FET, and/or software/device control FET of the sort described above.

As an additional example, an entity action FET might be created. Such an FET could be employed, for instance, in creating FEs which allowed a user to exploit a particular capability of the sort discussed above with respect to entity use FETs. For instance, such an FET might allow for establishment of an FE which could allow a user to dial a telephone call directed to an individual associated with a contact entity.

Included among data-type attributes and input-output-type attributes for such an FET could, for instance, be one or more attributes of the sort discussed above with respect to the exemplary entity use FET. As a specific example, with respect to input-output-type attributes, only a dial number command input-output-type attribute might be included.

Included among property-action-type attributes for such an FET could be, for example, be attributes regarding how user actions, perhaps provided by a GUI or the like, could affect operation of an FE created using the FET. For example, one or more attributes could be included that indicated that a user should be presented with an GUI widget which, when activated, would cause an individual associated with a particular contact to be telephoned (e.g., would cause the created FE to make use of a dial number command input-output-type attribute with respect to a data-type attribute holding a telephone number). It is noted that, in various embodiments, such an entity action FET could be created in a manner employing portions of an existing entity FET, software/device control FET, and/or entity use FET of the sort described above.

As a further example, a security FET might be created. Such an FET could be employed, for instance, in creating FEs related to burglar alarms, fire alarms, water leakage alarms, and/or the like. Included among data-type attributes for such an FET could, for instance, be an attribute to hold a network address via which an alarm system could be reached, one or more attributes to hold a log of alarm system events, and/or the like.

Included among input-output-type attributes for such an FET could, for instance, be one or more commands applicable in communicating, perhaps via one or more interface software modules, with burglar alarms, fire alarms, water leakage alarms, and/or the like. Among such commands could be, for example, arming commands, disarming commands, alarm cancel commands, panic commands, set status commands, read status (e.g., alarm status) commands, and/or the like.

Included among property-action-type attributes could, for example, be attributes regarding how information corresponding to operation of an FE created using the FET be displayed to a user, perhaps via a GUI or the like. For example, one or more attributes could be included that specified a GUI control panel for interacting with a security system with which communications were established.

In various embodiments, such a security FET might be created in a manner employing portions of an existing device control FET of the sort described above.

As another example, a security notify FET might be created. Such an FET could be employed, for instance, in creating FEs which acted to notify a user of one or more events occurring with regard to, for example, a security system of the sort just described. Included among data-type attributes and input-output-type attributes for such an FET could, for instance, be one or more attributes of the sort discussed above with respect to the exemplary security FET.

Included among property-action-type attributes for such an FET could be, for example, be attributes regarding how information corresponding to operation of an FE created using the FET be displayed to a user. For example, one or more attributes could be included that indicated that a user's node should vibrate, play a sound, flash and/or display a graphical element, and/or the like in response to occurrence of an alarm condition at a burglar alarm, fire alarm, water leakage alarm, and/or the like with which communications were established.

It is noted that, in various embodiments, in the case where the above-described exemplary security FET existed, that FET could be employed in the creation of such a security notify FET.

As another example, a security action FET might be created. Such an FET could be employed, for instance, in creating an FE which acted to telephone an appropriate emergency service in the case of an alarm condition with regard to, for example, a security system of the sort just described.

Included among data-type attributes and input-output-type attributes for such an FET could, for instance, be one or more attributes of the sort discussed above with respect to the exemplary security FET, and/or one or more attributes regarding one or more telephone numbers to be dialed in case of an alarm condition. Also included might, for example be data regarding one or more messages to be delivered, perhaps via voice synthesizer, to the appropriate recipient.

Included among property-action-type attributes for such an FET could be, for example, be attributes regarding how the functionality whereby an appropriate emergency service is contacted in case of alarm condition is handled. For example, one or more attributes could be included that indicated that a user's node should dial one or more numbers and/or deliver one or more messages, in accordance with provided input-output type attributes, in response to occurrence of an alarm condition at a burglar alarm system, fire alarm system, water leakage alarm system, and/or the like with which communications are established.

It is noted that, in various embodiments, in the case where the above-described exemplary security FET existed, that FET could be employed in the creation of such a security notify FET. It is further noted that, in various embodiments, one or more basic elements may be employed in the creation of FETs. Such basic elements might, for example, act to provide various attributes, functionalities, and/or the like such that, for instance, an FET created via use of such a basic element could come to possess one or more of the attributes, functionalities, and/or the like.

In various embodiments, one or more types of such basic elements could exist. For example, there could be basic element types employable in creating FETs related to entities, basic element types employable in creating FETs related to devices, basic element types employable in creating FETs related to software, and/or the like. Basic elements could, in various embodiments, be created by users, be provided to users by hardware manufactures, be provided to users by software manufactures, be provided to users by network providers, be provided to users by one or more of various third parties, and/or the like.

It is additionally noted that, in various embodiments, in the case where one or more attributes were selected for inclusion during construction of an FET, one or more other attributes might be selected automatically (e.g., by action of the node or other machine at which the FET was being created). For instance, selection for inclusion of certain input-output-category attributes might result in the automatic selection of certain data-category attributes. As a specific example, selection for inclusion of one or more input-output-category attributes relating to dialing of a telephone number could result in the automatic selection of one or more data-category attributes to hold one or more phone numbers.

With the attributes for the FET chosen, steps might be taken to store the new FET (step 205). For example, a node or the like might act to write corresponding data to an accessible database and/or other store. In various embodiments, steps might be further performed to make the new FET available for selection by one or more node users (step 207).

Interface Software Modules

As noted above, according to various embodiments of the present invention, one or more interface software modules (ISMs) may be employed in interoperating with devices, software, and/or the like. An ISM could, for instance, be provided by a manufacturer of a device and/or a piece of software, a third party, and/or the like. It is further noted that an ISM could, for instance, correspond to a single device and/or piece of software and/or to multiple devices and/or pieces of software.

An ISM might, for example, be run on the device with which it facilitates interoperation and/or be run on the device upon which the software with which it facilitates interoperation runs, be run on the node interoperating with the device and/or software, and/or be run on another device.

An ISM could in various embodiments be programmed to accept, perhaps from a user's node or the like, certain commands as input, and to output commands, application program interface (API) calls, messages, and/or the like understood by one or more devices, software, and/or the like. As alluded to above, in various embodiments the commands accepted as input could be of a generic type such that various different ISMs, perhaps relating to different sorts of devices and/or software, and/or to different brands, makes, models, and/or the like of devices and/or software, could accept similar and/or identical commands. As a specific example, in various embodiments one or more ISMs corresponding to microwave oven control and one or more ISMs corresponding to hot tub control could all accept as input the same command in order to set a timer.

Such generic commands could, for example, be established by a standards body, network provider, manufacturer's group, and/or the like. Accordingly, an ISM could, for example, be programmed to map received generic commands to commands specific to one or more particular devices, pieces of software, and/or the like.

Moreover, in various embodiments, an ISM could be programmed to receive output from one or more devices, pieces of software, and/or the like, and to pass appropriate corresponding data to, for instance, a user's node. In various embodiments, such appropriate corresponding data could, perhaps in a manner analogous to that discussed above with respect to commands passed to an ISM, be of a generic type.

Communications between an ISM and a user's node or the like, and/or between and ISM and one or more devices, pieces of software, and/or the like, could implemented in a number of ways. For example, simple object access protocol (SOAP), remote method invocation (RMI), Java messaging service (JMS), and/or the like might be employed.

Links

According to various embodiments of the present invention, links may be established between functional elements. Such a link may, for example, be an associative link or a hierarchical link. As is discussed in greater detail, such links may, in various embodiments, be displayed to users in one or more ways. It is noted that, in various embodiments, an FE may be subject to no links.

An associative link, could, in various embodiments, be employed to indicate a correlation between FEs. For example, in the case where there was an FE corresponding to a digital photo of an individual and an FE corresponding to contact information for that individual, an associative link could be established between the two FEs.

Links can, in various embodiments, be establishable by the action of a user, be establishable automatically, or both. Hence, with regard to the above example, such an associative link might, for instance, be created at the request of a user, and/or might be created automatically by a user's node. For instance, a user's node, with respect to an FE corresponding to a digital photo or the like, might consult associated metadata to determine the individuals with whom the photo was related and make appropriate associative links between the FE and, for example, contact information FEs corresponding to those individuals.

For example, an associative link arrangement might be established where an FE corresponding to an entity was correlated, via two associated links, to two FEs corresponding to contact information for two different individuals.

A hierarchical link could, in various embodiments, be employed to associate one or more FEs under a categorical heading or the like. In various embodiments, such a categorical heading could be represented as a hierarchical element (HE). Such an HE could, in various embodiments, be displayed in a user in a manner analogous to that of FEs. Accordingly, for example, an HE might be displayed to a user as an icon or the like via a GUI or the like provided to her.

For example, with regard to the above example, a hierarchical link might, alternately or additionally, be automatically created between the digital photo FE and for instance, an HE labeled "received images". It is noted that, in various embodiments, names may be associated with links. It is further noted that, in various embodiments, there may be HEs and/or FEs that are associated with no links.

As another example, an HE corresponding to the user of a node could be established, and hierarchical links could be established between the HE and all FEs associated with the user.

As yet another example, an HE named "recreation" could be established and an HE named "work" could be established, and, all contact information FEs corresponding to people known by a node's user for recreational purposes could be hierarchically linked to the "recreation" HE, and all contact information FEs corresponding to people known by a node's user for work purposes could be hierarchically linked to the "work" HE. It is noted that, in various embodiments, an FE could be hierarchically linked to more than one HE. Accordingly, further to the foregoing example, a contact information FE relating to an individual who was known for both recreational and work purposes could be hierarchically linked to both the "recreation" HE and the "work" HE.

It is noted that, according to various embodiments of the present invention, all FEs hierarchically linked to a particular HE could be considered to be associated with a particular situation, context, and/or the like. For instance, all FEs hierarchically linked to a "work" HE could be considered to be associated with a work context. A user could, in various embodiments, be presented with one or more HEs, FEs, and/or links associated with a particular situation, context, and/or the like.

HEs could, in various embodiments, be established in a manner of ways. For example, a user could, perhaps via a provided GUI or the like, request creation of a new HE, the user perhaps providing additional information such as the name that should be associated with the HE. As another example, HEs could be created automatically by a node, perhaps with the node further establishing one or more hierarchical links between the created HE and one or more FEs.

Figure 3:
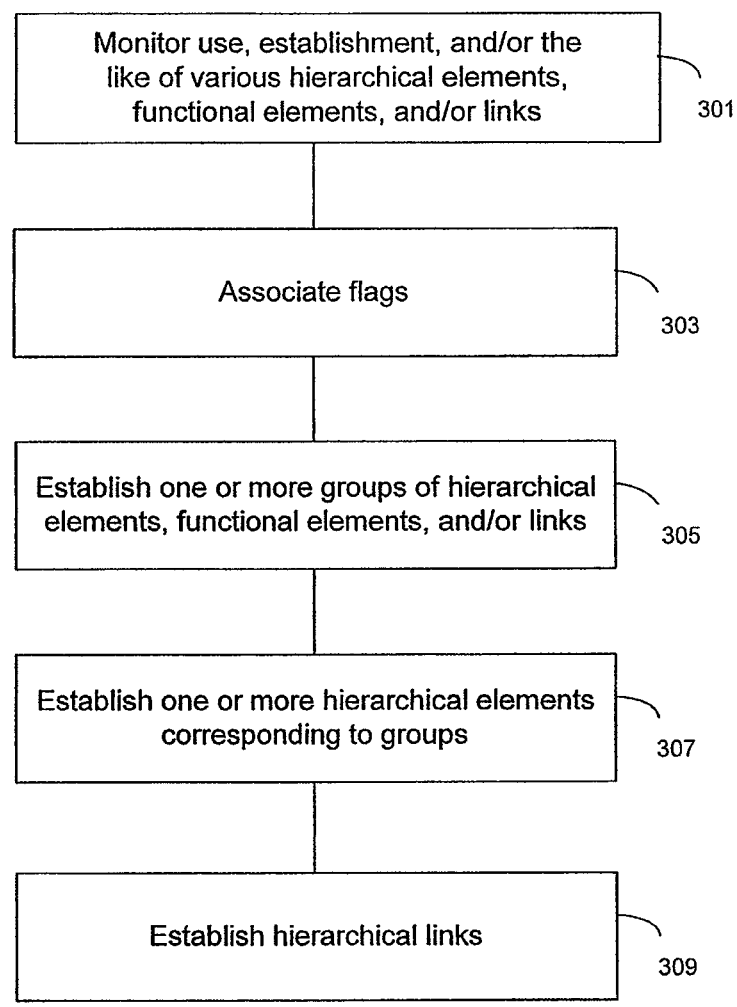
FIG. 3 is a diagram depicting exemplary steps involved in monitoring and hierarchal element establishment according to various embodiments of the present invention.

For instance, with regard to FIG. 3 it is noted that in various embodiments a user's node could act to monitor its user's use, establishment, and/or the like of various HEs, FEs, and/or links (step 301), and could, in various embodiments, further act to associate one or more flags with such HEs, FEs, and/or links (step 303). Such flags could, for instance, specify times of creations, times of usages, durations of usages, geographical locations of the node during usages, individuals associated with usages, and/or the like.

It is noted that, in various embodiments, location during usage might be known to a user's node, for example, via global position system (GPS) hardware, radio triangulation, a base station (e.g., a Bluetooth, 802.11b, and/or 802.11g base station) and/or radio beacon, and/or the like. It is further noted that, in various embodiments, individuals associated with usage might be known to a node, for example, via persons listed in a schedule entry to be participants in a meeting coinciding in time with a usage, and/or by a user's node being aware of proximal nodes (e.g., nodes in Bluetooth, 802.11b, and/or 802.11 g range) during a usage and associating those nodes with individuals, perhaps via correlations between those individuals and node identifiers. Such correlations might be held, for example, in a local and/or remotely-accessible store.

Having established the flags, the node could, for example, act to associate related HEs, FEs, and/or links into one or more groups (step 305), establish one or more HEs corresponding to these groups (step 307), and appropriately establish hierarchical links from the established HEs to the HEs, FEs, and/or links (step 309). A node's user could, in various embodiments, act to view HE, FEs, and/or links associated with HEs so established.

It is noted that, in various embodiments, such flags could, alternately or additionally, be employed in archiving HEs, FEs, and/or links. For example, HEs, FEs, and/or links not used with at least a threshold frequency, not used since at least a threshold date, and/or the like could be archived. Such threshold values could, for example, be set by the user, a network provider, a manufacturer, and/or the like.

Accordingly, for example, such HEs, FEs, and/or links selected for archiving could be moved from a database and/or other store in which they were held to an archive database and/or other store. In various embodiments, such HEs, FEs, and/or links could be stored in such an archive in a compressed manner. It is further noted that, in various embodiments, HEs, FEs, and/or links selected for deletion (e.g., by a node's user) could be placed in such an archive. Such deletion might, for instance, be requested by a user via a provided GUI or the like.

Archived HEs, FEs, and/or links could, in various embodiments, be not available to a user unless she requested that one or more of them be de-archived. A user might make such a request, for instance, via a provided GUI or the like.

According to various embodiments of the present invention, HEs could, perhaps in a manner analogous to that discussed above, be created by way of hierarchy element templates (HETs). Accordingly, an HET could, for example, possess one or more attributes capable of being passed on to HEs created using the HET. As another example, in various embodiments, one or more basic elements might, perhaps in a manner analogous to that discussed above, be employed in the creation of HETs.

Among the attributes possessed by an HET could, for example, be one or more data-category attributes which could act to hold various corresponding data. As one example a name for an HE created using the HET might be held. As another example of an attribute, an HET could include one or more filter-category attributes. Such attributes, when imparted to an HE created using the HET, could be employable by a user's node, for instance, in performing filtering operations.

Such filtering operations could, for example, involve the establishment of new HEs and/or hierarchical links in response to a user request to view only certain HEs, FEs, and/or links associated with a selected HE. As a specific example, a node user, perhaps via a supplied GUI or the like, might act to select a certain HE and request to view only those HEs, FEs, and/or links associated with the selected HE that possessed certain specified criteria. According to various embodiments of the present invention, a wide variety of criteria could be specifiable. For example, a user might provide criteria in terms of FE attributes, use statistics (e.g., times and/or durations of use), creation times, associated entity types, associated individuals, link names, and/or the like.

In response a user's node could, for example, act to, perhaps in a manner analogous to that discussed above, employ information provided by filter-category attributes possessed by the selected HE to establish a new HE corresponding to the appropriate HEs, FEs, and/or links, and to appropriately establish hierarchical links from the created HE to the HEs, FEs, and/or links. It is noted that, in various embodiments, in the case where the user specified use statistics as filtering criteria, the node might act to consult flags of the sort above in determining appropriate HEs, FEs, and/or links.

Operational Aspects

As noted above, in various embodiments of the present invention hierarchal and/or associative and/or links may be established.

According to various embodiments of the present invention, a node's user may be able to view relationships corresponding to the employment of such links. For example, a node may be able to present its user a view depicting relationships corresponding to hierarchical links. As another example, a node may be able to present its user a view depicting relationships corresponding to associative links.

For example, a node's user may be presented, perhaps via a GUI or the like, with a view wherein various graphical elements corresponding to established HEs, FEs, and hierarchical links are displayed, the graphical elements arranged in a manner intended to depict the established relationships that correspond to the hierarchical links.

Figure 4:
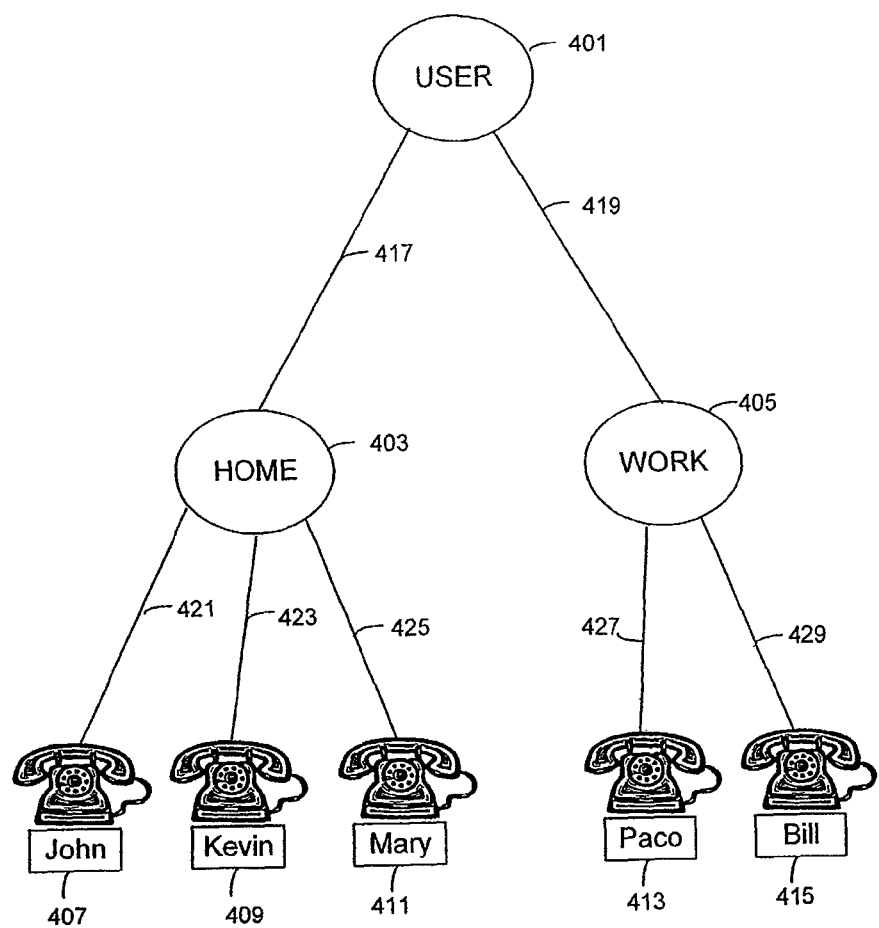
FIG. 4 is a diagram depicting an exemplary view showing hierarchal links according to various embodiments of the present invention.

Shown in FIG. 4 is such an exemplary view. In FIG. 4, graphical element 401, labeled "user", is placed to depict an HE of the sort described above corresponding to a node's user. Further shown in FIG. 4 are graphical elements 403 and 405, labeled "home" and "work" respectively, and placed to depict established HEs. Also shown in FIG. 4 are graphical elements 417 and 419, intended to depict established hierarchical links between the depicted HEs.

Additionally shown in FIG. 4 are graphical elements 407-411, labeled "John", "Kevin", and "Mary" respectively, and placed to depict established FEs corresponding to contact information entities. Also shown in FIG. 4 are graphical elements 421-425, intended to depict established hierarchical links.

Still further shown in FIG. 4 are graphical elements 413 and 415, labeled "Paco" and "Bill" respectively, and placed to depict established FEs corresponding to contact information entities. Also shown in FIG. 4. are graphical elements 427 and 429, intended to depict established hierarchical links.

It is noted that, in various embodiments, hierarchy might only be displayed to a user down to a certain number of levels from the highest-level HE and/or FE displayed, and a user might be able to indicate a desire to see deeper levels. For instance, a user might be able to select a lowest-level displayed HE and/or FE and, in response, be presented with a display in which the selected HE and/or FE was the highest-level HE and/or FE displayed, and in which HEs and/or FEs that had not been displayed in the previous view but which were lower in level than the selected HE and/or FE would be displayed.

As another example, a node's user may be presented, perhaps via a GUI or the like, with a view wherein various graphical elements corresponding to established HEs, FEs, and associative links are displayed, the graphical elements arranged in a manner intended to depict established relationships that correspond to the associative links.

Figure 5:
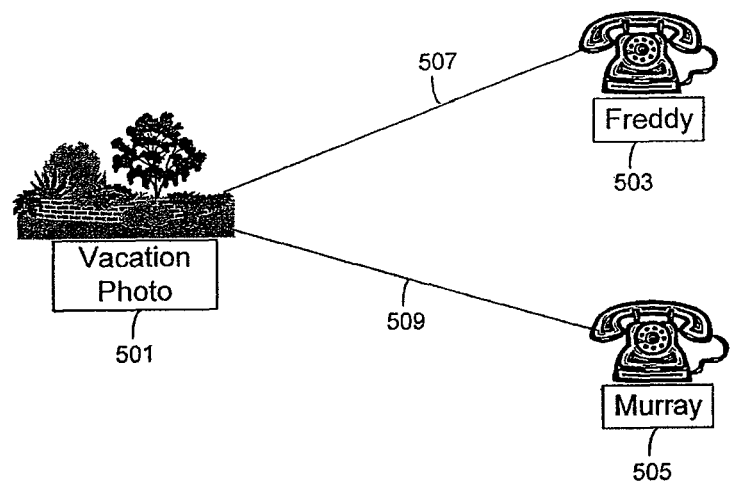
FIG. 5 is a diagram depicting an exemplary view showing associative links according to various embodiments of the present invention.

Shown in FIG. 5 is such an exemplary view. In FIG. 5, graphical element 501, labeled "vacation photo", is placed to depict an FE corresponding to a digital photograph entity. Also shown in FIG. 5 are graphical elements 503 and 505, labeled "Freddy" and "Murray" respectively, and place to depict established FEs corresponding to contact information entities. Additionally shown in FIG. 5 are graphical elements 507 and 509, intended to depict established associative links between these FEs It is noted that, in various embodiments, the display characteristics of such graphical elements, such as depicted labels, images, and/or the like, could be in accordance with various attributes (e.g., property-action category attributes) of the HEs, FEs, and/or the like.

According to various embodiments of the present invention, a user could be presented various customized views corresponding to HEs, FEs, and/or links. For example, a user could be presented with HEs, FEs, and/or links corresponding to one or more particular HEs. Such functionality might be employed, for example, where an HE is associated with a situation, context, and/or the like as discussed above. Accordingly, a user could, for example, be presented with HEs, FEs, and/or links corresponding to a particular situation, context, and/or the like by way of being shown, perhaps via a GUI or the like, the HEs, FEs, and/or links hierarchically associated with an appropriate HE.

In various embodiments, a user might be able to request such display, for instance, by employing a provided GUI or the like to request that she receive display of HEs, FEs, and/or the like associated with a specified situation, context, and/or the like.

As another example, in various embodiments a user's node might automatically cause such display. For instance, a user's node could perform monitoring to determine the occurrence of various situations, contexts, and/or the like, and could request appropriate such display where a particular situation, context, and/or the like came into being.

In performing such monitoring, the node could, for example, act to monitor for specific information that would indicate that a particular context had come into being. For example, in the case where a situation, context, and/or the like was location dependent, the node could monitor physical location, perhaps in a manner analogous to that discussed above.

As another example, in the case where a situation, context, and/or the like was dependent upon one or more individuals being present, the node could monitor for the presence of such individuals, perhaps in a manner analogous to that discussed above. As still another example, in the case where a situation, context, and/or the like was dependent upon time of day, the node could monitor time of day.

In various embodiments, such information regarding how occurrence of a situation, context, and/or the like could be recognized could, for example, be held as an attribute (e.g., as a data-category attribute) of the HE corresponding to the situation, context, and/or the like.

As another example of a customized view, a user could request to see only HEs, FEs, and/or links associated with a particular specified HE. For example, a user might establish an HE labeled "social", and employ hierarchical links to associate appropriate HEs, FEs, and/or links with the new HE. In the case where the user later wanted to view a display corresponding to such HEs, FEs, and/or links, the user could request a customized view corresponding to the "social" HE.

It is noted that, in various embodiments where all HEs, FEs, and/or links were associated with a single HE of the sort noted above associated with a node's user, in the case where the user wished to view all of her HEs, FEs, and/or links she could request a customized view corresponding to that HE. As still another example of customized views, a user could request to see HEs, FEs, and/or links associated with a particular FE.

As yet another example, a user could be presented with display corresponding to only FEs matching certain criteria, with the user perhaps being shown links and/or HEs corresponding to the matching FEs. For instance, a user might specify that she only wished display FEs corresponding to tasks, calendar entries, contacts, text, media, and/or the like. In preparing such a display, the user's node could, for example, examine data held in FE attributes, and/or examined data reached via links specified in FE attributes.

It is noted that, in various embodiments, a user could receive display of only hierarchical links, only associative links, and/or both. Moreover, with regard to the above examples of custom views, it is noted that in various embodiments it might be possible to specify whether hierarchical links, associative links, and/or both should be shown.

According to various embodiments of the present invention, a user might be able to receive display of FEs in a way where no links are shown. For example, a user might receive display of FEs corresponding to contact information entities in a way where graphical elements corresponding to the FEs were arranged on a map of an area in accordance with location information held by and/or linked to by the FEs.

In preparing such a map display the user's node could, for example, examine location data held in FE attributes, and/or examine data reached via links specified in FE attributes. In examining the location data the node might, in various embodiments, make use of interface software modules and/or input-output category attributes held by the FEs.

It is further noted that, in various embodiments, a user might be able to receive display of various information regarding a particular FE. For example, a user might receive display of information regarding a schedule entry wherein, for instance, start time, end time, intervening milestones, and/or the like were displayed on a graphical timescale.

In preparing such a display, the user's node could, for example, examine corresponding data held in FE attributes, and/or examine data reached via links specified in FE attributes. In examining the data the node might, in various embodiments, make use of interface software modules and/or input-output category attributes held by the FEs.

As a further example of display regarding a particular FE, as alluded to above, in various embodiments a user may receive display whereby a particular device and/or piece of software could be controlled. For example, a user selecting via a GUI or the like provided by her node a graphical element corresponding to an FE relating to a washing machine might be presented with a graphical control panel whereby she could control the machine. As another example, a user selecting via a GUI or the like provided by her node a graphical element corresponding to an FE relating to an alarm system might be presented with a graphical control panel whereby she could control the alarm system. As alluded to above, such display of a control panel could be in accordance with attributes held by an FE.

As yet another example, in the case where a user selected via a GUI or the like a graphical element corresponding to an FE relating to a text document, media clip, and/or the like, the user might be presented with a graphical interface or the like whereby she could view and/or edit the text document, media clip, and/or the like. In various embodiments, in offering such viewing and/or editing functionality to the user, the user's node might make use of one or more interface software modules and/or input-output category attributes held by the FE in interfacing with, for example, word processing software, audio editing software, video editing software, and/or the like.

As alluded to above, in various embodiments a user might receive display of graphical elements corresponding to FEs established to execute one or more particular functions when selected, and/or corresponding to FEs established to cause certain display and/or other noticeable changes with occurrence of events. Accordingly, for example, a user might receive display of a graphical element corresponding to an FE such that selection of the graphical element could cause a device to turn on. As another example, a user might receive display of a graphical element corresponding to an FE such that the graphical element would flash upon a burglar alarm device detecting an alarm condition.

As alluded to above, in various embodiments a user could establish links between HEs and/or FEs. It is noted that, in various embodiments, a user might be able to do such, for example, by employing a provided GUI or the like to select one or more HEs, FEs, and/or the like, and to specify the sort of links that should be established, the user perhaps being able to further provide names for such links.

It is further noted that, in various embodiments, display to a user could be via one or more display program modules which communicated with one or more other program modules, with the display program modules communicating with the other program modules via an established protocol. Such functionality and/or ways of accessing it might, for example, be referred to as a "View Programming Interface". It is further noted that various aspects described herein may be implemented in a distributed fashion. Accordingly, in various embodiments, various data, program modules, and/or the like involved in operation of the sort described herein could exist on a user's node and/or on one or more other machines (e.g., servers and/or user nodes) with appropriate communications occurring between the user's node the external machines as necessary. For instance, such communications might involve SOAP, RMI, and/or JMS. It is noted that, in various embodiments, peer-to-peer, grid computing, and/or the like might be employed.

Moreover, it is noted that various HEs, FEs, FETs, HETs, ISMs, basic element types, hierarchical structures, and/or the like could be provided in a number of ways. For example, such could be created, provided, sold, and/or the like by users, system administrators, device manufacturers, software manufactures, various third parties, and/or the like.

Hardware and Software

Certain operations and the like described herein may be executed by and/or with the help of computers. Further, the nodes described herein may be and/or may incorporate computers. The phrases "computer", "general purpose computer", and the like, as used herein, refer but are not limited to a processor card smart card, a media device, a personal computer, an engineering workstation, a PC, a Macintosh, a PDA, a computerized watch, a node, a wired or wireless terminal, a server, a network access point, a network multicast point, a set-top-box, a personal video recorder (PVR), game console, or the like, perhaps running an operating system such as OS X, Linux, Darwin, Windows CE, Windows XP, Windows Server 2003, Palm OS, Symbian OS, or the like, perhaps employing the Series 60 Platform, and perhaps having support for Java and/or .Net.

Figure 6:
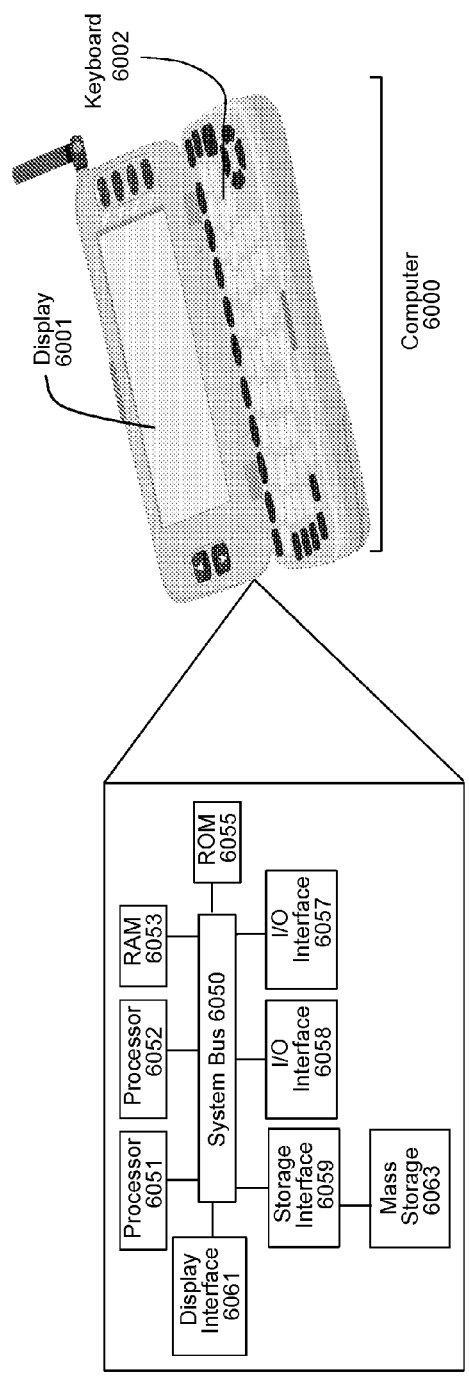
FIG. 6 shows an exemplary general purpose computer employable in various embodiments of the present invention.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 6000 as shown in FIG. 6 includes system bus 6050 which operatively connects two processors 6051 and 6052, random access memory 6053, read-only memory 6055, input output (I/O) interfaces 6057 and 6058, storage interface 6059, and display interface 6061. Storage interface 6059 in turn connects to mass storage 6063. Each of I/O interfaces 6057 and 6058 may be an Ethernet, IEEE 1394, IEEE 1394b, IEEE 802.11a, IEEE 802.11b, IEEE 802.11g, IEEE 802.16a, IEEE 802.20, IEEE 802.15.3, Zig-Bee, Bluetooth, terrestrial digital video broadcast (DVB-T), satellite digital video broadcast (DVB-S), digital audio broadcast (DAB), general packet radio service (GPRS), Universal Mobile Telecommunications Service (UMTS), DVB-X, IrDA (Infrared Data Association), or other interface known in the art.

Mass storage 6063 may be a hard drive, optical drive, or the like. Processors 6057 and 6058 may each be a commonly known processor such as an IBM or Motorola PowerPC, an AMD Athlon, an AMD Opteron, an Intel ARM, an Intel XScale, a Transmeta Crusoe, an Intel Xenon, or an Intel Pentium. Computer 6000 as shown in this example also includes a touch screen 6001 and a keyboard 6002. In various embodiments, a mouse, keypad, and/or interface might alternately or additionally be employed. Computer 6000 may additionally include or be attached to card readers, DVD drives, floppy disk drives, and/or the like whereby media containing program code may be inserted for the purpose of loading the code onto the computer.

In accordance with various embodiments of the present invention, a computer may run one or more software modules, engines, and/or the like designed to perform one or more of the above-described operations. Such modules might, for example, be programmed using languages such as Java, Objective C, C, C#, and/or C++ according to methods known in the art. Corresponding program code might be placed on media such as, for example, DVD, CD-ROM, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, peer-to-peer and/or grid computing techniques may be employed.

Figure 7:
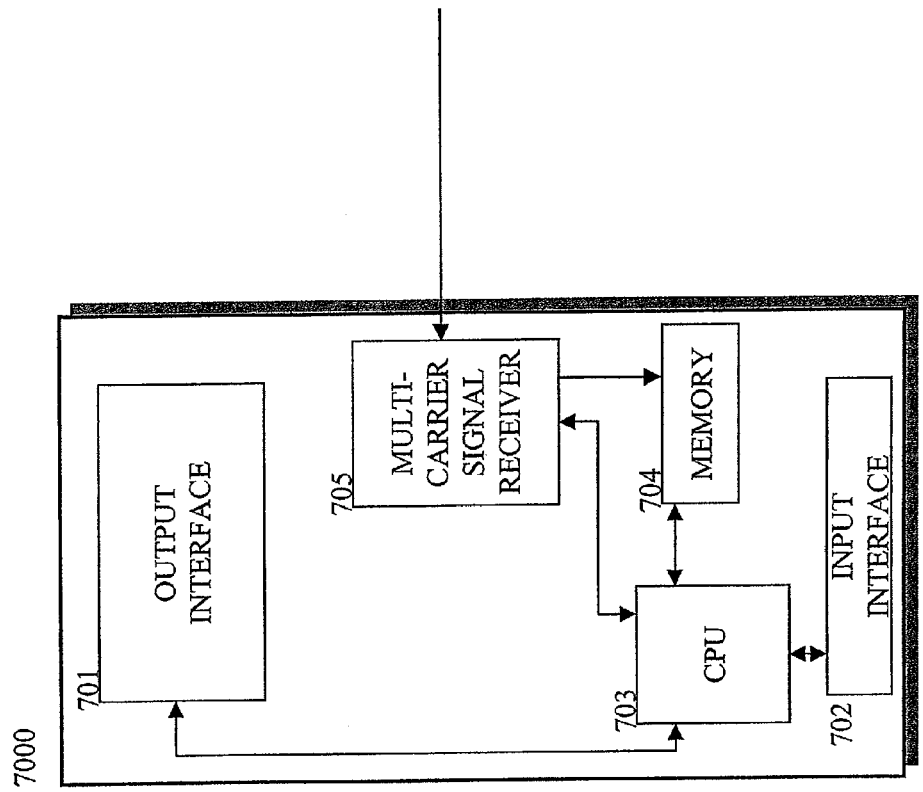
FIG. 7 shows a functional block diagram of an exemplary node employable in various embodiments of the present invention.

Shown in FIG. 7 is a functional block diagram of an exemplary terminal employable in various embodiments of the present invention. The terminal of FIG. 7 has been discussed in the foregoing. In the following, corresponding reference signs have been applied to corresponding parts. Terminal 7000 of FIG. 7 may be used in any/all of the embodiments described herein. The terminal 7000 comprises a processing unit CPU 703, a multi-carrier signal terminal part 705 and a user interface (701, 702). The multi-carrier signal terminal part 705 and the user interface (701, 702) are coupled with the processing unit CPU 703.

One or more direct memory access (DMA) channels may exist between multi-carrier signal terminal part 705 and memory 704. The user interface (701, 702) comprises a display and a keyboard to enable a user to use the terminal 7000. In addition, the user interface (701, 702) comprises a microphone and a speaker for receiving and producing audio signals. The user interface (701, 702) may also comprise voice recognition (not shown).

The processing unit CPU 703 comprises a microprocessor (not shown), memory 704 and possibly software. The software can be stored in the memory 704. The microprocessor controls, on the basis of the software, the operation of the terminal 7000, such as the receiving of the data stream, the tolerance of the impulse burst noise in the data reception, displaying output in the user interface and the reading of inputs received from the user interface. The operations are described above. The hardware contains circuitry for detecting the signal, circuitry for demodulation, circuitry for detecting the impulse, circuitry for blanking those samples of the symbol where significant amount of impulse noise is present, circuitry for calculating estimates, and circuitry for performing the corrections of the corrupted data.

Still referring to FIG. 7, alternatively, middleware or software implementation can be applied. The terminal 7000 can be a hand-held device which the user can comfortably carry. Advantageously, the terminal 7000 can be a cellular mobile phone which comprises the multi-carrier signal terminal part 705 for receiving the multicast transmission stream. Therefore, the terminal 7000 may possibly interact with the service providers.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A method, comprising:
   receiving an indication from a user via an interface that a functional element is to be established;
   receiving, in response to the indication that the functional element is to be established, a functional element template including a plurality of attributes;
   receiving a specification of one or more attributes for inclusion in the functional element, wherein receiving said specification of one or more attributes comprises receiving a selection by the user of one or more attributes from the functional element template to be included in the functional element; and
   establishing the functional element in order to interoperate with a device or software or to work with an entity in accordance with the attributes selected by the user for inclusion in the functional element.

2. A method as claimed in claim 1, wherein the one or more attributes comprise one or more of a data-type attribute for holding data or a link to data, an input-output type attribute including information regarding one or more commands or command pathways, or a property-action type attributes including information regarding an action to be performed or a property regarding interaction with a user or display to a user.

3. A method as claimed in claim 2, wherein the data-type attributes comprise user-selected data-type attributes comprising a network address via which the device is reached.

4. A method as claimed in claim 2, wherein the input-output-type attributes comprise one or more commands applicable to communicating with a device.

5. A method as claimed in claim 4, wherein the one or more commands include a turn-on command, a turn-off command, a set status command, a read status command or a software-access command.

6. A method as claimed in claim 1, wherein receiving a selection by the user comprises receiving a selection of the device with which interoperation should occur.

7. A method as claimed in claim 1, wherein establishing the functional element comprises establishing a hierarchical link between the functional element and another functional element.

8. A method as claimed in claim 5, wherein establishing a hierarchical link comprises establishing a hierarchical link by associating one or more functional elements under a categorical heading having a hierarchical element associated therewith.

9. A method as claimed in claim 6, wherein establishing the functional element comprises associating the functional element with a situation or context of the hierarchical element with which the functional element has a link.

10. A method as claimed in claim 1, wherein establishing the functional element comprises establishing an associative link between the functional element and another functional element defining a correlation between the functional elements.

11. An apparatus, comprising: at least one processor; and at least one memory including computer program code, the at least one memory and the computer program code configured to, with the at least one processor, cause the apparatus at least to perform:
    receive an indication from a user via an interface that a functional element is to be established;
    receive, in response to the indication that the functional element is to be established, a functional element template including a plurality of attributes;
    receive a specification of one or more attributes for inclusion in the functional element, wherein receiving said specification of one or more attributes comprises receiving a selection by the user of one or more attributes from the functional element template to be included in the functional element; and
    establish the functional element in order to interoperate with a device or software or to work with an entity in accordance with the attributes selected by the user for inclusion in the functional element.

12. An apparatus as claimed in claim 11, wherein the one or more attributes comprise one or more of a data-type attribute for holding data or a link to data, an input-output type attribute including information regarding one or more commands or command pathways, or a property-action type attribute including information regarding an action to be performed or a property regarding interaction with a user or display to a user.

13. An apparatus as claimed in claim 12, wherein the data-type attributes include user-selected data-type attributes comprising a network address via which the device is reached.

14. An apparatus as claimed in claim 12, wherein the input-output-type attributes comprises one or more commands applicable to communicating with a device.

15. An apparatus as claimed in claim 14, wherein the one or more commands include a turn-on command, a turn-off command, a set status command, a read status command or a software-access command.

16. An apparatus as claimed in claim 11, wherein the at least one memory and the computer program code are configured to, with the at least one processor, cause the apparatus to receive a selection by the user by receiving a selection of the device with which interoperation should occur.

17. An apparatus as claimed in claim 11, wherein the at least one memory and the computer program code are configured to, with the at least one processor, cause the apparatus to establish the functional element by establishing a hierarchical link between the functional element and another functional element.

18. An apparatus as claimed in claim 17, wherein the at least one memory and the computer program code are configured to, with the at least one processor, cause the apparatus establish a hierarchical link by establishing a hierarchical link by associating one or more functional elements under a categorical heading having a hierarchical element associated therewith.

19. An apparatus as claimed in claim 18, wherein the at least one memory and the computer program code are configured to, with the at least one processor, cause the apparatus establish the functional element by associating the functional element with a situation or context of the hierarchical element with which the functional element has a link.

20. An apparatus as claimed in claim 11, wherein the at least one memory and the computer program code are configured to, with the at least one processor, cause the apparatus to establish the functional element by establishing an associative link between the functional element and another functional element defining a correlation between the functional elements.

\* \* \* \* \*

UNITED STATES PATENT AND TRADEMARK OFFICE
CERTIFICATE OF CORRECTION

PATENT NO. : 9,654,349 B2
APPLICATION NO. : 14/934311
DATED : May 16, 2017
INVENTOR(S) : Kautto-Koivula et al.

Page 1 of 1

It is certified that error appears in the above-identified patent and that said Letters Patent is hereby corrected as shown below:

In the Claims

Column 18,
Line 15, "claim 5," should read --claim 7,--.
Line 20, "claim 6," should read --claim 8,--.

Signed and Sealed this
Twentieth Day of March, 2018

Andrei Iancu
*Director of the United States Patent and Trademark Office*